(12) United States Patent
Schreiber

(10) Patent No.: US 8,622,372 B2
(45) Date of Patent: Jan. 7, 2014

(54) FAN COOLING TOWER DESIGN AND METHOD

(75) Inventor: Helmut Schreiber, Oberhausen (DE)

(73) Assignee: SPX Cooling Technologies, Overland Park, KS (US)

( * ) Notice: Subject to any disclaimer, the term of this patent is extended or adjusted under 35 U.S.C. 154(b) by 8 days.

(21) Appl. No.: 13/042,094

(22) Filed: Mar. 7, 2011

(65) Prior Publication Data

US 2012/0228787 A1    Sep. 13, 2012

(51) Int. Cl.
*B01F 3/04* (2006.01)

(52) U.S. Cl.
USPC .................. 261/153; 261/157; 261/DIG. 11; 261/DIG. 77

(58) Field of Classification Search
USPC ................. 261/138, 153, 157, 158, 160, 161, 261/DIG. 11, DIG. 77
See application file for complete search history.

(56) References Cited

U.S. PATENT DOCUMENTS

| 3,831,667 | A | * | 8/1974 | Kilgore et al. | 165/96 |
|---|---|---|---|---|---|
| 3,903,212 | A | * | 9/1975 | Lefevre | 261/30 |
| 3,923,935 | A | * | 12/1975 | Cates | 261/159 |
| 3,982,914 | A | * | 9/1976 | Grimble | 96/356 |
| 4,076,771 | A | * | 2/1978 | Houx et al. | 261/159 |
| 4,098,854 | A | * | 7/1978 | Knirsch et al. | 261/161 |
| 4,361,524 | A | * | 11/1982 | Howlett | 261/150 |
| 4,514,344 | A | * | 4/1985 | Ruscheweyh | 261/159 |
| 4,747,980 | A | * | 5/1988 | Bakay et al. | 261/129 |
| 5,449,036 | A | * | 9/1995 | Genge et al. | 165/104.19 |
| 2004/0150124 | A1 | * | 8/2004 | Yazici et al. | 261/109 |
| 2010/0154406 | A1 | * | 6/2010 | Conard et al. | 60/531 |

* cited by examiner

*Primary Examiner* — Charles Bushey
(74) *Attorney, Agent, or Firm* — Baker & Hostetler LLP

(57) ABSTRACT

A hybrid cooling tower apparatus that extends along a vertical axis is provided. The cooling tower includes a first housing structure having an inlet and a first outlet located a first position along the vertical axis, wherein the housing structure includes a base and opposing side walls that extend along the vertical axis away from the base. The tower also includes a heat exchanger disposed in the housing structure, wherein the heat exchanger is positioned adjacent the first outlet and extends at least partially all the way across the first outlet. Finally the hybrid tower employs an air current generator positioned in a plane normal to the vertical axis and oriented to direct an air stream toward the base and through the heat exchanger and the first outlet.

18 Claims, 4 Drawing Sheets

FAN COOLING TOWER DESIGN AND METHOD

FIELD OF THE INVENTION

The present invention relates generally to cooling tower apparatus for providing heat exchange. More particularly, the present invention relates to a method and apparatus for providing efficient heat exchange for industrial processes while also allowing for the abatement of cooling tower plume as desired.

BACKGROUND OF THE INVENTION

In electricity generation using steam driven turbines, water is heated by a burner to create steam which drives a turbine to create electricity. Also in other industrial processes water is needed for cooling. In order to minimize the amount of clean water necessary for this process, the steam must be converted back into water, by removing heat, so that the water can be reused in the process. In air conditioning systems for large buildings, air inside the building is forced passed coils containing a cooled refrigerant gas thereby transferring heat from inside the building into the refrigerant gas. The warmed refrigerant is then piped outside the building where the excess heat must be removed from the refrigerant so that the refrigerant gas can be re-cooled and the cooling process continued.

In both of the foregoing processes, and numerous other processes that require the step of dissipating excess heat, cooling towers have been employed. In wet type cooling towers, water is pumped passed a condenser coil containing the heated steam, refrigerant, or other heated liquid or gas, thereby transferring heat into the water. The water is then pumped to the top of the heat exchangers and sprayed over a cooling tower media comprised of thin sheets of material or splash bars. As the water flows down the cooling tower media, ambient air is forced passed the heated water and heat is transmitted from the water to the air by both sensible and evaporative heat transfer. The air is then forced out of the cooling tower and dissipated into the surrounding air.

Cooling towers are highly efficient and cost effective means of dissipating this excess heat and thus are widely used for this purpose. A recognized drawback to cooling towers, however, is that under certain atmospheric conditions a plume can be created by moisture from the heated water source evaporating into the air stream being carried out of the cooling tower. Where the cooling tower is very large, as in the case of power plants, the plume can cause low lying fog in the vicinity of the cooling tower. The plume can also cause icing on roads in the vicinity of the cooling tower where colder temperatures cause the moisture in the plume to freeze. Efforts have therefore been made to limit or eliminate the plume caused by cooling towers.

One common way to limit plume is the introduction of ambient air. For example, plume abated cooling towers are employed where ambient air, in addition to being brought in at the bottom of the tower and forced upwards through a fill pack as hot water is sprayed down on the fill pack, is brought into the cooling tower through isolated heat conductive passageways above the hot water spray heads. These passageways which are made from a heat conductive material such as aluminum, steel, copper, etc., allow the ambient air to absorb some of the heat without moisture being evaporated into the air. Also, above the cooling fill, the wet laden heated air and the dry heated air are mixed thereby reducing the plume.

Another cooling tower orientation employs a plume abatement system in which the hot water is partially cooled before being provided into the cooling tower. The partial cooling of the hot water is performed using a separate heat exchanger operating with a separate cooling medium such as air or water. The separate heat exchanger reduces the efficiency of the cooling tower and thus should only be employed when atmospheric conditions exist in which a plume would be created by the cooling tower.

Another example of a system designed to reduce plume in a wet type cooling tower entails pumping hot water through a dry air cooling section where air is forced across heat exchange fins connected to the flow. The water, which has been partially cooled, is then sprayed over a fill pack positioned below the dry air cooling section and air is forced through the fill pack to further cool the water. The wet air is then forced upwards within the tower and mixed with the heated dry air from the dry cooling process and forced out the top of the tower.

While the foregoing systems provide heat exchange for industrial processes in combination with solutions for addressing plume abatement, these systems or solutions oftentimes require the construction of a complex, and oftentimes costly, wet and dry air heat transfer mechanisms. This cost is partly due to each respective heat transfer mechanism, wet and dry, requiring use of separate vertical fan systems to provide air flow through their respective wet and dry sections. For example, during operation of such systems, and individual fan system is required to provide an air stream through the dry section and a second, separate fan system is required to provide an air stream through the wet section. The employment of the separate wet and dry fan systems add additional construction cost during construction. Also, the fan apparatus for the dry sections are typically oriented in a vertical position, requires the tower height to be significantly larger which is often times not desired or allowed. Moreover, each the individual fan systems require maintenance during the life cycle of the cooling tower systems, adding to the cost of operation of such systems.

Another drawback is the foregoing systems and design is the above-discussed fan assemblies are vertical in orientation as previously mentioned. This vertical orientation while may not be a drawback per se, it requires that the fans be a limited size and therefore additional fan assemblies may be required. This vertical orientation requires the towers to be larger in height and space as previously discussed increasing the vertical size of said cooling towers, potentially limiting the locations where the tower may be employed.

The foregoing shows that there is a need for a cost efficient cooling tower that allows for plume abatement as needed, in an efficient, economical manner. Moreover there is a need for a cost effective cooling tower system that utilizes an efficient plume abatement system would therefore be desirable.

SUMMARY OF THE INVENTION

In one aspect of the invention a hybrid cooling tower apparatus that extends along a vertical axis is provided comprising: a first housing structure having an inlet and a first outlet located a first position along the vertical axis, wherein said housing structure includes a base and opposing side walls that extend along the vertical axis away from said base; a heat exchanger disposed in said housing structure, wherein said heat exchanger is positioned adjacent said first outlet and extends at least partially all the way across said first outlet; and an air current generator positioned in a plane normal to the vertical axis and oriented to direct an air stream toward the base and through said heat exchanger and said first outlet.

In another aspect of the invention a hybrid cooling tower apparatus that extends along a vertical axis is provided comprising: a first housing structure having an inlet and a first outlet located at a first position along the vertical axis, wherein said housing structure includes a base and opposing side walls that extend along the vertical axis away from said base; a heat exchanger disposed in said housing structure, wherein said heat exchanger is positioned adjacent said first outlet and extends at least partially all the way across the outlet; an air current generator positioned in a plane normal to the vertical axis and oriented direct an air stream toward the base and through said heat exchanger and said outlet; a second outlet located at a position vertically below said first outlet; a second housing structure that extends along the vertical axis in fluid communication with said first housing structure; said second housing structure comprising: a third air inlet located adjacent the first outlet; a fourth air inlet located adjacent the second outlet; a second air outlet; an evaporative heat transfer media disposed in said second housing; a water distribution assembly disposed above said evaporative heat transfer media configured to distribute water on said evaporative heat transfer media; and a collection basin disposed beneath the evaporative heat transfer media that collects water that has passed through the heat transfer media.

In another aspect of the invention a hybrid cooling tower apparatus that extends along a vertical axis is provided comprising: a housing structure having an inlet at a first position along the vertical axis and an outlet located a second position along the vertical axis, wherein the second position is located below the first position and wherein said housing structure includes a base and opposing side walls that extend along the vertical axis away from said base; an air current generator positioned in a plane normal to the vertical axis and oriented direct an air stream toward the base and through said outlet a second housing structure that extends along the vertical axis in fluid communication with said first housing structure; said second housing structure comprising: an evaporative heat transfer media disposed in said second housing; a water distribution assembly disposed above said evaporative heat transfer media configured to distribute water on said evaporative heat transfer media; and a collection basin disposed beneath the evaporative heat transfer media that collects water that has passed through the heat transfer media.

In another aspect of the invention a method of cooling a fluid using a hybrid cooling tower is provided comprising: a cooling tower having a vertical axis apparatus comprising: a first housing structure having an inlet and a first outlet located a first position along the vertical axis, wherein said housing structure includes a base and opposing side walls that extend along the vertical axis away from said base; a heat exchanger disposed in said housing structure, wherein said heat exchanger is positioned adjacent said first outlet and extends at least partially all the way across said first outlet; and an air current generator positioned in a plane normal to the vertical axis and oriented to direct an air stream toward the base and through said heat exchanger and said first outlet; flowing the industrial fluid to be cooled through the heat exchanger; generating an airflow with via the air current generator and flowing the airflow through the heat exchanger and to induce heat exchange and through the first outlet.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
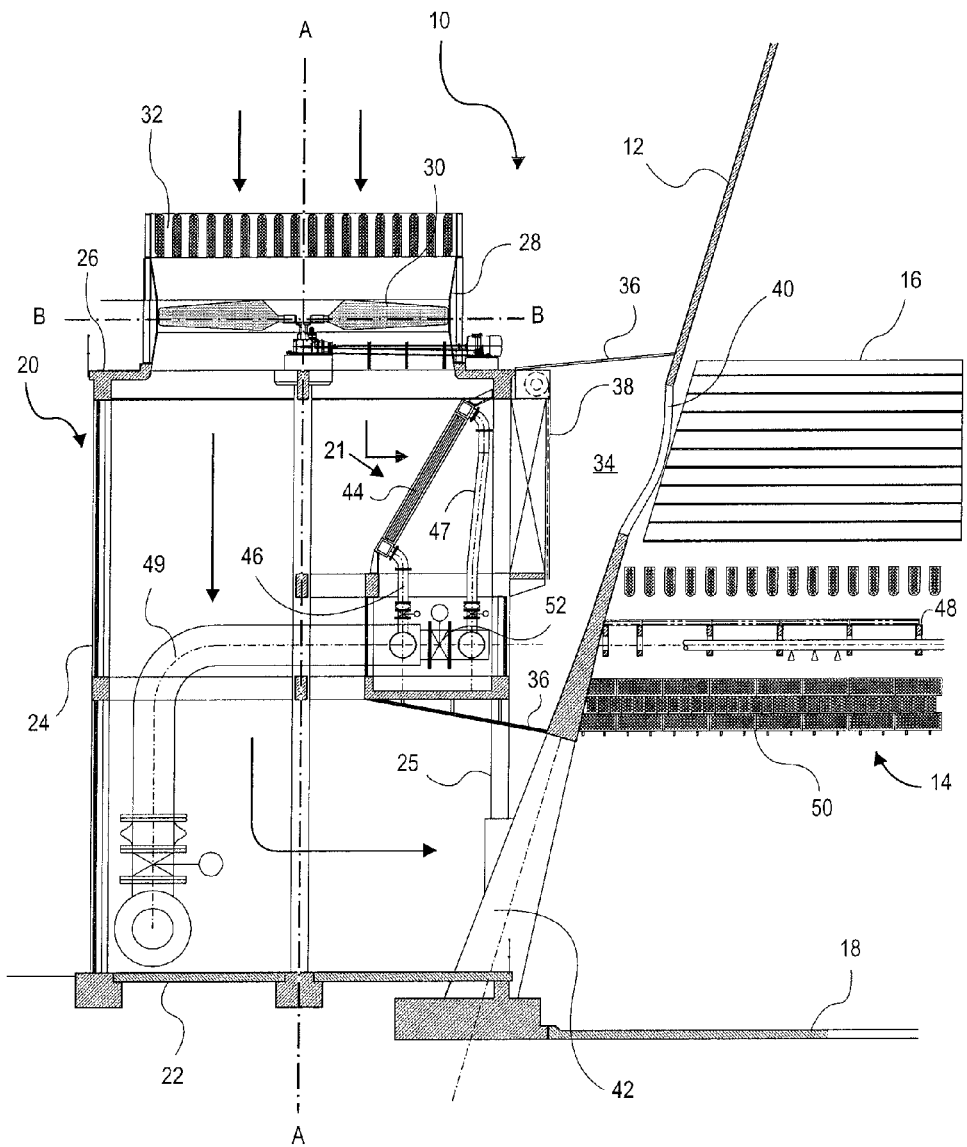
FIG. 1 is a schematic view of a portion of a hybrid cooling tower of a preferred embodiment of the invention.

Some embodiments according to the invention provide a cooling tower and method that can provide desirable efficiencies while also reducing plume. Examples of preferred embodiments will now be described with reference to the drawing figures, in which like reference numbers refer to like parts throughout.

Figure 2:
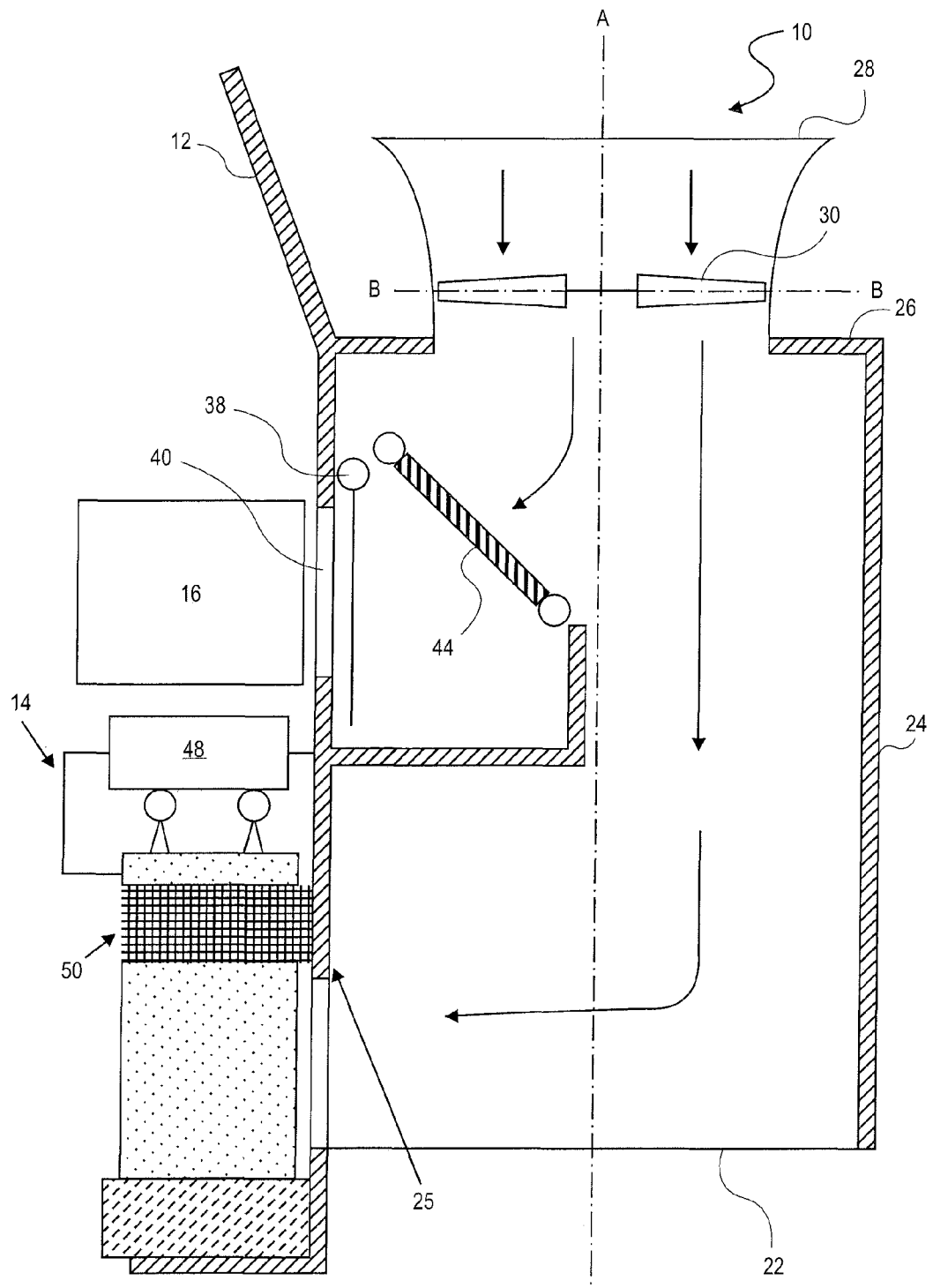
FIG. 2 is a schematic view of a portion of a hybrid cooling tower of another preferred embodiment of the invention.

Turning now to FIGS. 1 and 2, a schematic diagram of an embodiment of the invention is depicted. In this embodiment, a partial view of a cooling tower 10 is generally depicted. The cooling tower 10 has a an internal framework (not illustrated) which supports the various components that will be discussed. The cooling tower 10 includes a tower shell 12 wherein the shell 12 internally houses a wet heat exchanger section 14 and air mixing ducts and components 16. The tower shell 12 also houses a cold water basin 18.

Also as depicted in FIGS. 1 and 2, the cooling tower 10 includes an air delivery section, generally designated 20, that is positioned outside or external to the tower shell 12. The air delivery section 20 generally includes a support structure or frame assembly comprising a base 22 and walls 24. The walls 24, 25 extend upwardly along a plane parallel to a vertical axis A away from the base 22 to a top portion 26 to which a fan shroud 28 is attached. The fan shroud 28 houses a fan 30 and portions of its drive mechanism. As illustrated, the fan 30 lies in a plane B that is normal or perpendicular to the vertical axis A. In some embodiments, the air delivery portion 20 may include a sound attenuation apparatus 32 which is attached to the fan shroud 28.

Turning now specifically to the dry heat exchange apparatus 21, the wall 25 includes an upper airflow outlet 34 having upper and lower walls 36. The upper airflow outlet 34 is connected to the tower shell 12 and is fluid communication with a shell opening 40. The outlet 34 may also include a shutter door and/or damper 38 that allows for the control of airflow through the outlet 34. The air delivery section 20 also includes a lower outlet 42 that is in fluid communication with the wet heat exchange section 14.

The dry heat exchange apparatus 21 employs a heat exchanger 44 through which air flows. The heat exchanger 44 is positioned in front of the upper outlet 34, and preferably extends the length of the upper outlet 34. As illustrated, the heat exchanger 44 is connected to a series of conduits that carry the liquid or gas to be cooled, to and from the heat exchanger 44. The conduits comprise an inlet conduit 46 and an outlet conduit 47.

Referring back to the wet heat exchanger 14, it includes a cooling water distribution assembly 48 and cooling fill 50. As previously mentioned, the wet heat exchanger 14 includes the cold water basin 18. The cold water basin 18 is positioned below the water distribution assembly and cooling fill 50.

Figure 3:
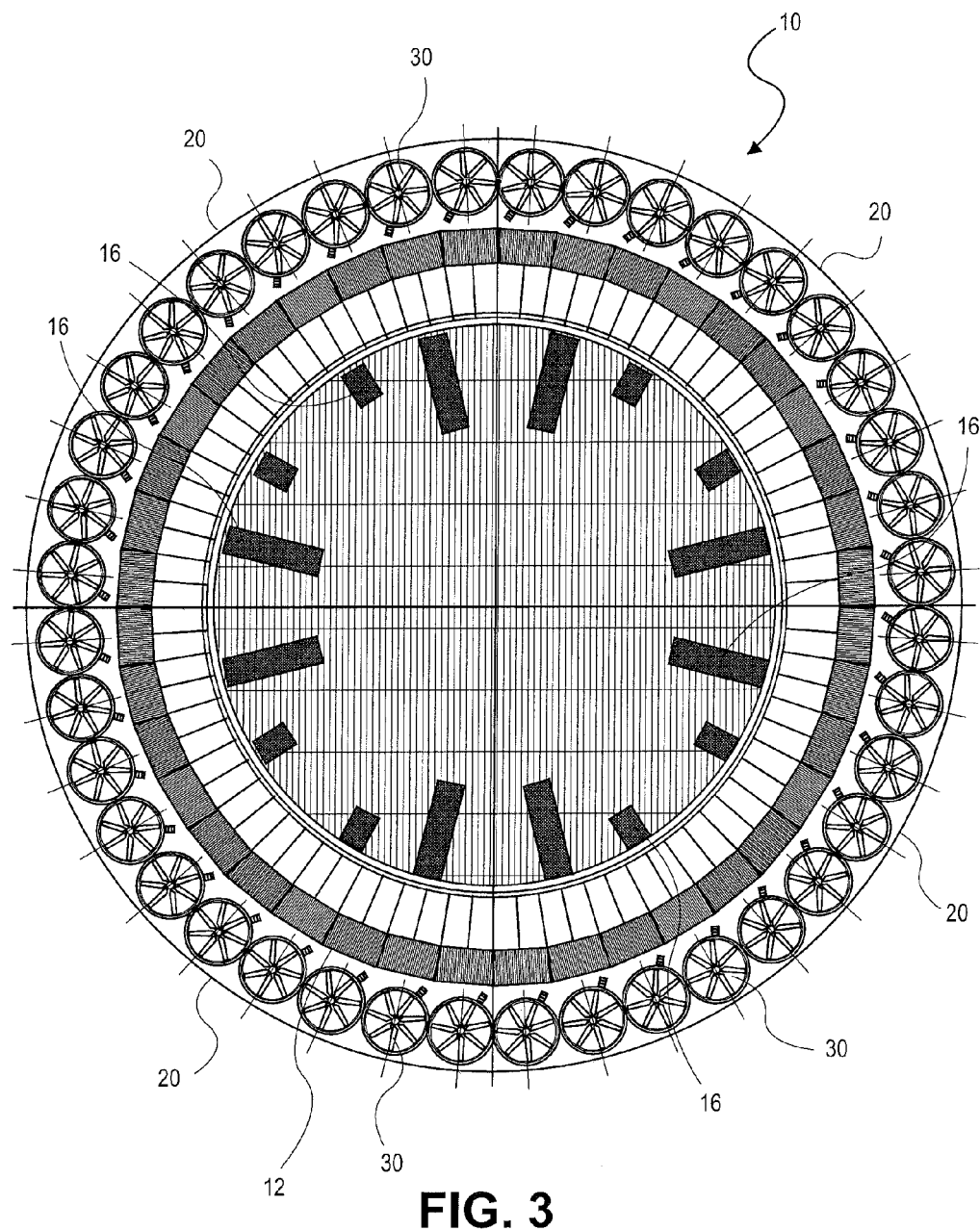
FIG. 3 is a plan view of a hybrid cooling tower design in accordance with an embodiment of the present invention.

Turning now to FIG. 3, and partial plan, schematic view of the cooling tower 10 of FIGS. 1 and 2 is depicted, illustrating the wet heat exchange sections encircling the tower shell 12. The respective air flow fans 30 are also illustrated positioned on top of each of the respective air delivery sections 20. FIG. 3 also depicts the various air mixing ducts 16 extending radially inward from the tower shell 12. The air mixing ducts 16 can have varying lengths in order to provide ambient air to different radial locations, ensuring all portions of the cooling tower 10 have ambient air available. Moreover, the varying lengths of the ducts 16 ensure an ample supply of ambient air is provided around the perimeter of the cooling tower 10.

Referring now to FIGS. 1-3, during operation of the cooling tower 10, the fan 30 functions to force air downward as indicated by the arrows. As previously discussed, the fan 30 is positioned horizontally along axis B. This positioning allows for the fan 30 to have a large diameter if desired. For example, in some applications the fan 30 may have a diameter greater than 7.1 meters. Moreover, in other applications, the fan may have a diameter of approximately 8.5 meters. The orientation and range in diameter size allow for only a single fan to be employed for the operation of the cooling tower 10, eliminating the need for multiple fan assemblies.

If the damper 38 is open, the air will flow through the heat exchanger 44 and through the shell 12. Concurrently, as indicated by the arrows, the air stream continues to flow downward through the lower outlet 42 and into the wet heat exchange portion 14. To the contrary, if the damper 38 is closed, the air stream will not flow through the dry heat exchanger 44 and will flow downward through the lower outlet 42 as previously described. The damper 38 may be utilized to adjust airflow through the dry heat exchanger 44 as discussed where additional cooling is desired and/or in conditions where plume abatement is desired.

Simultaneously as the fan 30 is directing the airflow through the tower 10, water is supplied to the supply conduit 49. The fluid, which is referred to herein as water or inlet water, may in some exemplary industrial applications range from 40° F. to 210° F. Although water is described in the following examples, various embodiments can be used with other fluids, including treated water or other liquids, any or all of which are referred to as water herein. The inlet water is passed to a two-way diverter valve, or control valve 52 as detailed in FIG. 1. In one configuration, the control valve 52 directs all or some of the water through the conduit 46 so that it enters the dry heat exchanger 44.

The dry heat exchanger 44 may include a serious of coils or tubes (not pictured) or the like. The water travels through the heat exchanger 44 and is cooled by the tubes or coils operating as a closed circuit heat exchanger with the ambient air. The water exits then the heat exchanger 44 via the outlet conduit 47 at which point it flows onto the wet heat exchange section 14.

Turning now to the heat exchange wet section 14 as illustrated in FIGS. 1 and 2, the water departs the dry heat exchanger 44 and enters the cooling water distribution assembly 48. The water distribution assembly 48, can take many forms for example, a tray having nozzles or a conduit system have nozzles attached thereto, wherein the water drips or is sprayed downward from the from the distribution assembly in a distributed fashion.

As it is sprayed or distributed, the water will contact and pass through the heat exchange media 50. The heat exchange media 50 can take many forms, for example an evaporative fill media such as a series of splash bars or a sheet fill pack. As the water contacts the heat exchange media 50 heat exchange occurs. As the water exits the fill media, the water is collected in the cool water basin 18. The water in the water cool water basin 18 can be extracted by a pump or gravity flow and returned to the process location for use or exhausted into the environment.

Figure 4:
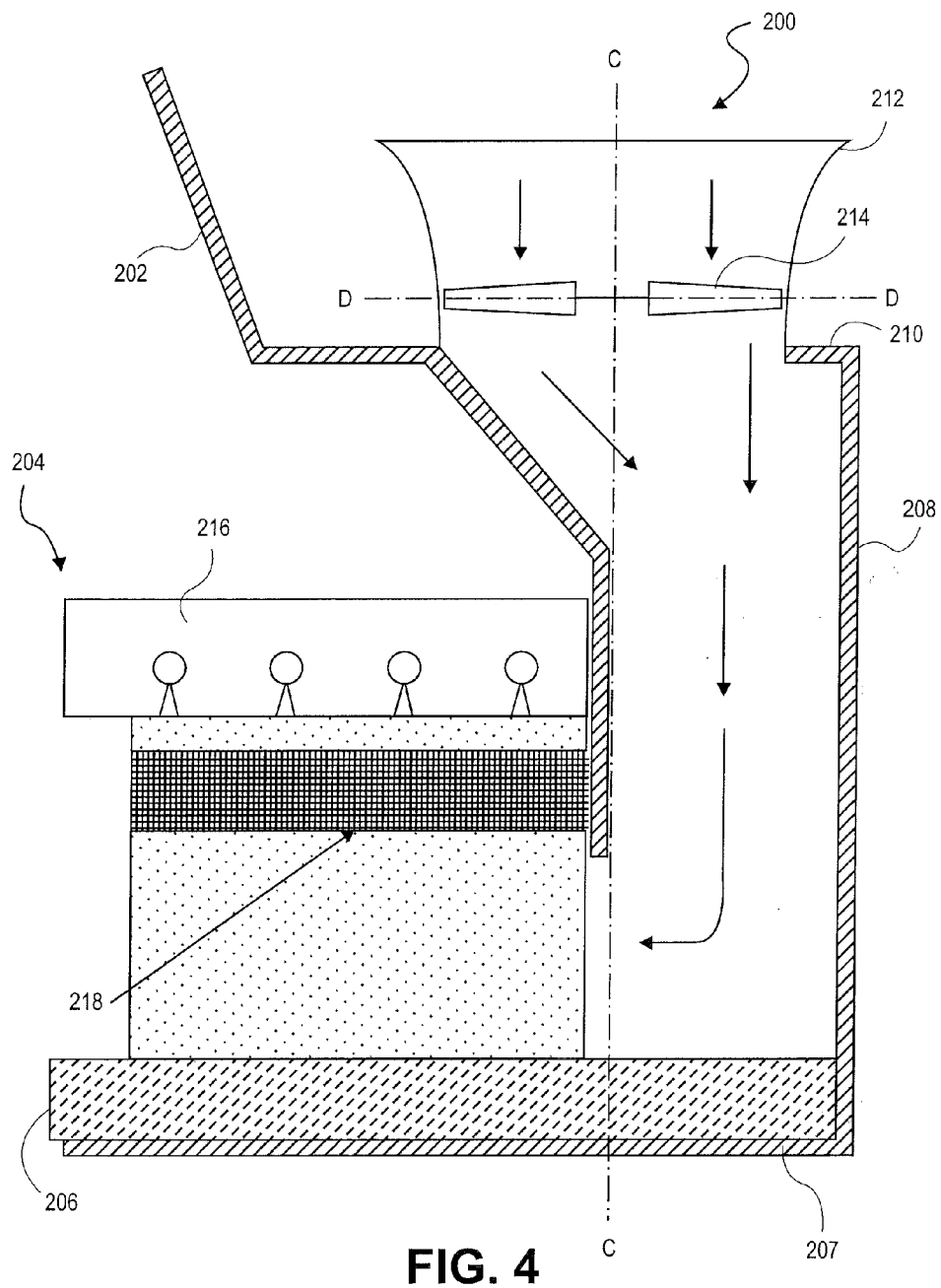
FIG. 4 is a schematic view of a portion of a wet cooling tower of another preferred embodiment of the invention.

Turning now to FIG. 4, a wet cooling tower in accordance with another embodiment of the present invention is depicted. The hybrid cooling tower, generally designated 200, is similar to the embodiments described and discussed in connection with FIGS. 1-3, however instead of employing both a wet and a dry heat exchange section, the cooling tower 200 employs a wet section only.

The cooling tower 200 has a an internal framework (not illustrated) which supports the various components that will be discussed The cooling tower 200 includes a tower shell 202 wherein the shell 202 internally houses a wet heat exchanger section 204 along with a cold water basin 206. The cooling tower 200 generally includes a support structure of frame assembly comprising a base 207 and support walls 208. The walls 208 extend upwardly along a vertical axis C away from the base 207 to a top portion 210 to which a fan shroud 212 is attached. The fan shroud 212 houses a fan 214 and portions of its drive mechanism. As illustrated, the fan 214 lies in a plane D that is normal or perpendicular to the vertical axis C. The wet heat exchanger further includes a cooling water distribution assembly 216 and cooling fill 218 positioned above the cold water basin 206.

During operation of the cooling tower 200, the fan 214 functions for force air downward as indicated by the arrows. As previously discussed, the fan 214 is positioned horizontally along axis D. This positioning allows for the fan 214 to have a large diameter. For example, in some applications the fan 214 may have a diameter greater than 7.1 meters. Moreover, in other applications, the fan 214 may have a diameter of approximately 8.5 meters. The orientation and range in diameter size allow for only a single fan to be employed for the operation of the cooling tower 200, eliminating the need for multiple fan assemblies.

As the fan assembly generates the downward airstream, the liquid to be cooled enters the cooling water distributions assembly 216. The water distribution assembly 216, for example, can take many forms as discussed in connection with the other embodiments, for example, a tray having nozzles or a conduit system having dispersement nozzles attached thereto. The water drips or is sprayed downward from the from the distribution assembly 216 in a distributed fashion. As it is sprayed, the water will contact and pass through the heat exchange media 218. The heat exchange media can take many forms, for example an evaporative fill media such as a series of splash bars or a sheet fill pack. As the water contacts the heat exchange media 218 heat exchange occurs. As the water exits the fill media, the water is collected in the cool water basin 206. The water in the cool water basin 207 can be extracted by a pump or gravity flow and returned to the process location for use or exhausted into the environment.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A hybrid cooling tower apparatus that extends along a vertical axis, comprising:
    a cooling tower;
    a wet heat exchanger disposed within the cooling tower, the wet heat exchanger comprising:
        an evaporative heat transfer media; and
        a water distribution assembly disposed above the evaporative heat transfer media, the water distribution assembly being configured to distribute water on the evaporative heat transfer media;
    an air delivery housing having an inlet and a first outlet, the first outlet being in fluid communication with the wet heat exchanger, wherein a flow of air passing through the first outlet is directed to flow up through the wet heat exchanger and out the cooling tower, wherein said air delivery housing includes a base and opposing side walls that each extend along respective planes that are parallel to the vertical axis and the opposing side walls each extend away from said base;
    a dry heat exchanger housing disposed in said air delivery housing, wherein said dry heat exchanger housing extends at least partially across the inlet, the dry heat exchanger housing comprising:
        a dry heat exchanger; and
        a dry heat outlet in fluid communication with the cooling tower that is relatively above the wet heat exchanger, wherein air flowing through the dry heat exchanger bypasses the wet heat exchanger; and
    an air current generator positioned in a plane normal to the vertical axis and oriented to direct an air stream toward the base and through said dry heat exchanger and said wet heat exchanger.

2. The hybrid cooling tower according to claim 1, further comprising:
    a collection basin disposed beneath the evaporative heat transfer media that collects water that has passed through the heat transfer media.

3. The hybrid cooling tower according to claim 1, further comprising a shutter door that extends at least partially across said dry heat outlet wherein said shutter door operates in an open and closed position to control the flow through said dry heat outlet.

4. The hybrid cooling tower according to claim 1, further comprising a sound attenuation apparatus located at a position along the vertical axis above the air current generator.

5. The hybrid cooling tower according to claim 1, wherein the air current generator has a diameter greater than 7.1 meters.

6. The hybrid cooling tower according to claim 5, wherein the air current generator has a diameter of up to 8.5 meters.

7. The hybrid cooling tower according to claim 1, wherein the dry heat exchanger is a closed coil heat exchanger.

8. The hybrid cooling tower according to claim 2, further comprising a shutter door that extends at least partially across the dry heat outlet wherein said shutter door operates to control the flow through the dry heat outlet.

9. The hybrid cooling tower according to claim 2, wherein the evaporative media is a sheet fill pack.

10. The hybrid cooling tower according to claim 2, wherein the evaporative media is a series of splash bars.

11. A hybrid cooling tower apparatus that extends along a vertical axis, comprising:
    a cooling tower;
    a wet heat exchanger disposed within the cooling tower, the wet heat exchanger comprising:
        an evaporative heat transfer media;
        a water distribution assembly disposed above the evaporative heat transfer media, the water distribution assembly being configured to distribute water on the evaporative heat transfer media; and
        a collection basin disposed beneath the evaporative heat transfer media that collects water that has passed through the heat transfer media;
    an air delivery housing having an inlet and a first outlet, the first outlet being in fluid communication with the wet heat exchanger, wherein a flow of air passing through the first outlet is directed to flow up through the wet heat exchanger and out the cooling tower, wherein said air delivery housing includes a base and opposing side walls that each extend along respective planes that are parallel to the vertical axis and the opposing side walls each extend away from said base;
    a dry heat exchanger housing disposed in said air delivery housing, wherein said dry heat exchanger housing extends at least partially across the inlet, the dry heat exchanger housing comprising:
        a dry heat exchanger; and
        a dry heat outlet in fluid communication with the cooling tower that is relatively above the wet heat exchanger, wherein air flowing through the dry heat exchanger bypasses the wet heat exchanger;
    an air mixing duct disposed above the wet heat exchanger to mix the flow of air from the wet heat exchanger with the flow of air from the dry heat outlet; and
    an air current generator positioned in a plane normal to the vertical axis and oriented to direct an air stream toward the base and through said dry heat exchanger and said wet heat exchanger.

12. The hybrid cooling tower according to claim 11, further comprising a damper that extends at least partially across the dry heat outlet wherein said damper operates to control the flow of air through the dry heat outlet.

13. The hybrid cooling tower according to claim 12, further comprising a sound attenuation apparatus located at a position along the vertical axis above the air current generator.

14. The hybrid cooling tower according to claim 11, wherein the air current generator has a diameter greater than 7.1 meters.

15. The hybrid cooling tower according to claim 14, wherein the air current generator has a diameter of up to 8.5 meters.

16. The hybrid cooling tower according to claim 11, wherein the dry heat exchanger is a closed coil heat exchanger.

17. A method of cooling a fluid using a hybrid cooling tower, comprising the steps of:

generating a flow of air through a cooling tower having a wet heat exchanger disposed therein;

diverting a portion of the flow of air from the wet heat exchanger prior to the portion of the flow of air entering the wet heat exchanger and passing the diverted flow of air through a dry heat exchanger housing disposed in an air delivery housing;

reintroducing the diverted flow of air to the cooling tower above the wet heat exchanger;

increasing the diverted flow of air passing through a dry heat exchanger disposed in the dry heat exchanger housing to decrease a plume of condensing moisture exiting the cooling tower;

decreasing the diverted flow of air passing through the dry heat exchanger to increase the plume of condensing moisture exiting the cooling tower; and flowing a fluid to be cooled through a closed coil heat exchanger disposed in the dry heat exchanger housing.

18. The method according to claim 17, further comprising the steps of:

distributing water on an evaporative heat transfer media disposed in the cooling tower with a water distribution assembly disposed above said evaporative heat transfer media;

collecting water that has passed through the heat transfer media with a collection basin disposed beneath the evaporative heat transfer media;

mixing the diverted flow of air with the flow of air passing through the wet heat exchanger prior to the flow of air exiting the cooling tower.

\* \* \* \* \*